(12) United States Patent
Lutter

(10) Patent No.: US 8,375,243 B1
(45) Date of Patent: *Feb. 12, 2013

(54) FAILURE DETERMINATION SYSTEM

(75) Inventor: Robert Pierce Lutter, Tacoma, WA (US)

(73) Assignee: Eagle Harbor Holdings, LLC, Bainbridge Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/188,856

(22) Filed: Jul. 22, 2011

Related U.S. Application Data

(63) Continuation of application No. 12/851,488, filed on Aug. 5, 2010, now Pat. No. 8,020,028, which is a continuation of application No. 11/616,650, filed on Dec. 27, 2006, now Pat. No. 7,793,136, which is a continuation of application No. 10/132,886, filed on Apr. 24, 2002, now Pat. No. 7,178,049.

(51) Int. Cl.
    *G06F 11/00* (2006.01)
(52) U.S. Cl. .................................. 714/1; 714/2
(58) Field of Classification Search .................. 714/1, 2, 714/3, 10, 13; 718/1, 100, 101, 102, 103, 718/104, 106, 107
See application file for complete search history.

(56) References Cited

U.S. PATENT DOCUMENTS

| | | | |
|---|---|---|---|
| 2,995,318 A | 8/1961 | Cocharo | |
| 3,812,468 A | 5/1974 | Wollum et al. | |
| 4,303,978 A | 12/1981 | Shaw | |
| 4,528,563 A | 7/1985 | Takeuchi | |
| 4,558,460 A | 12/1985 | Tanaka | |
| 4,591,976 A | 5/1986 | Webber | |
| 4,735,274 A | 4/1988 | Good et al. | |
| 4,829,434 A | 5/1989 | Karmel | |
| 4,835,537 A | 5/1989 | Manion | |
| 4,907,159 A | 3/1990 | Mauge | |
| 4,931,930 A | 6/1990 | Shyu et al. | |
| 5,008,678 A | 4/1991 | Herman | |
| 5,027,432 A | 6/1991 | Skala | |
| 5,031,330 A | 7/1991 | Stuart | |
| 5,045,937 A | 9/1991 | Myrick | |
| 5,111,401 A | 5/1992 | Everett, Jr. | |
| 5,115,245 A | 5/1992 | Wen | |
| 5,243,640 A | 9/1993 | Hadley et al. | |
| 5,245,909 A | 9/1993 | Corrigan | |
| 5,287,199 A | 2/1994 | Zoccolillo | |
| 5,303,297 A | 4/1994 | Hillis | |
| 5,339,086 A | 8/1994 | DeLuca | |
| 5,341,301 A | 8/1994 | Shirai | |

(Continued)

FOREIGN PATENT DOCUMENTS

| | | |
|---|---|---|
| DE | 3125161 | 1/1983 |
| DE | 4237987 | 5/1994 |

(Continued)

OTHER PUBLICATIONS

A. Das, R. Fierro, V. Kumar, J. Ostrowski, J. Spletzer, and C. Taylor, "A Framework for Vision Based Formation Control", IEEE Transactions on Robotics and Automation, vol. 18, Nov. 5, 2001, pp. 1-13.

(Continued)

*Primary Examiner* — Dieu-Minh Le

(74) *Attorney, Agent, or Firm* — Stolowitz Ford Cowger LLP

(57) ABSTRACT

A system-failure determination system fo a vehicle, made up of processors linked together that control or monitor the systems of a vehicle, that includes critical and non-critical applications that generate data. Certain data from the critical applications would be useful for the reconstruction of a system failure or for the reconstruction of an accident; and configuring an executive to monitor and store data for later recovery to determine cause.

17 Claims, 5 Drawing Sheets

U.S. PATENT DOCUMENTS

| | | |
|---|---|---|
| 5,438,361 A | 8/1995 | Coleman |
| 5,471,214 A | 11/1995 | Faibish |
| 5,485,892 A | 1/1996 | Fujita |
| 5,506,963 A | 4/1996 | Ducateau |
| 5,532,706 A | 7/1996 | Reinhardt |
| 5,552,773 A | 9/1996 | Kuhnert |
| 5,555,503 A | 9/1996 | Kyrtsos et al. |
| 5,572,201 A | 11/1996 | Graham |
| 5,579,219 A | 11/1996 | Mori et al. |
| 5,581,462 A | 12/1996 | Rogers |
| 5,585,798 A | 12/1996 | Yoshioka |
| 5,617,085 A | 4/1997 | Tsutsumi |
| 5,646,612 A | 7/1997 | Byon |
| 5,661,811 A | 8/1997 | Huemann et al. |
| 5,742,141 A | 4/1998 | Czekaj |
| 5,749,060 A | 5/1998 | Graf |
| 5,751,211 A | 5/1998 | Shirai |
| 5,754,123 A | 5/1998 | Nashif et al. |
| 5,761,320 A | 6/1998 | Farinelli |
| 5,786,998 A | 7/1998 | Neeson |
| 5,787,246 A | 7/1998 | Lichtman |
| 5,794,164 A | 8/1998 | Beckert et al. |
| 5,872,508 A | 2/1999 | Taoka |
| 5,898,392 A | 4/1999 | Bambini |
| 5,907,293 A | 5/1999 | Tognazzini |
| 5,915,214 A | 6/1999 | Reece |
| 5,943,427 A | 8/1999 | Massie |
| 5,948,040 A | 9/1999 | DeLorme et al. |
| 5,951,620 A | 9/1999 | Ahrens et al. |
| 5,956,016 A | 9/1999 | Kuenzner et al. |
| 5,956,025 A | 9/1999 | Gudat et al. |
| 5,957,985 A | 9/1999 | Wong |
| 5,959,536 A | 9/1999 | Chambers |
| 5,963,092 A | 10/1999 | VanZalinge |
| 5,964,822 A | 10/1999 | Alland |
| 5,966,658 A | 10/1999 | Kennedy, III |
| 5,969,598 A | 10/1999 | Kimura |
| 5,974,554 A | 10/1999 | Oh |
| 5,977,906 A | 11/1999 | Ameen |
| 5,983,092 A | 11/1999 | Whinnett |
| 5,983,161 A | 11/1999 | Lemelson |
| 6,009,330 A | 12/1999 | Kennedy, III |
| 6,009,403 A | 12/1999 | Sato |
| 6,028,537 A | 2/2000 | Suman |
| 6,028,548 A | 2/2000 | Farmer |
| 6,032,089 A | 2/2000 | Buckely |
| 6,037,860 A | 3/2000 | Zander et al. |
| 6,052,632 A | 4/2000 | Iihoshi |
| 6,054,950 A | 4/2000 | Fontana |
| 6,060,989 A | 5/2000 | Gehlot |
| 6,061,002 A | 5/2000 | Weber et al. |
| 6,061,709 A | 5/2000 | Bronte |
| 6,075,467 A | 6/2000 | Ninagawa |
| 6,097,285 A | 8/2000 | Curtin |
| 6,097,314 A | 8/2000 | Desens et al. |
| 6,128,608 A | 10/2000 | Barnhill |
| 6,144,336 A | 11/2000 | Preston |
| 6,148,261 A | 11/2000 | Obradovich |
| 6,150,961 A | 11/2000 | Alewine |
| 6,154,123 A | 11/2000 | Kleinberg |
| 6,161,071 A | 12/2000 | Shuman |
| 6,163,711 A | 12/2000 | Juntunen |
| 6,166,627 A | 12/2000 | Reeley |
| 6,167,253 A | 12/2000 | Farris |
| 6,169,894 B1 | 1/2001 | McCormick |
| 6,175,728 B1 | 1/2001 | Mitama |
| 6,175,782 B1 | 1/2001 | Obradovich |
| 6,181,922 B1 | 1/2001 | Iwai |
| 6,181,994 B1 | 1/2001 | Colson |
| 6,182,006 B1 | 1/2001 | Meek |
| 6,185,491 B1 | 2/2001 | Gray |
| 6,195,760 B1 | 2/2001 | Chung et al. |
| 6,198,996 B1 | 3/2001 | Berstis |
| 6,202,027 B1 | 3/2001 | Alland |
| 6,203,366 B1 | 3/2001 | Muller |
| 6,204,804 B1 | 3/2001 | Andersson |
| 6,226,389 B1 | 5/2001 | Lemelson, III |
| 6,233,468 B1 | 5/2001 | Chen |
| 6,236,652 B1 | 5/2001 | Preston |
| 6,240,365 B1 | 5/2001 | Bunn |
| 6,243,450 B1 | 6/2001 | Jansen |
| 6,243,645 B1 | 6/2001 | Moteki et al. |
| 6,247,079 B1 | 6/2001 | Papa et al. |
| 6,252,544 B1 | 6/2001 | Hoffberg |
| 6,275,231 B1 | 8/2001 | Obradovich |
| D448,366 S | 9/2001 | Youngers |
| 6,292,109 B1 | 9/2001 | Murano |
| 6,292,747 B1 | 9/2001 | Amro |
| 6,294,987 B1 | 9/2001 | Matsuda |
| 6,297,732 B2 | 10/2001 | Hsu |
| 6,298,302 B2 | 10/2001 | Walgers |
| 6,314,326 B1 | 11/2001 | Fuchu |
| 6,321,344 B1 | 11/2001 | Fenchel |
| 6,326,903 B1 | 12/2001 | Gross |
| 6,327,536 B1 | 12/2001 | Tsuji |
| 6,362,748 B1 | 3/2002 | Huang |
| 6,370,449 B1 | 4/2002 | Razavi et al. |
| 6,374,286 B1 | 4/2002 | Gee |
| 6,377,860 B1 | 4/2002 | Gray |
| 6,382,897 B2 | 5/2002 | Mattio |
| 6,389,340 B1 | 5/2002 | Rayner |
| 6,401,029 B1 | 6/2002 | Kubota |
| 6,405,132 B1 | 6/2002 | Breed |
| 6,408,174 B1 | 6/2002 | Steijer |
| 6,417,782 B1 | 7/2002 | Darnall |
| 6,421,429 B1 | 7/2002 | Merritt |
| 6,429,789 B1 | 8/2002 | Kiridena |
| 6,429,812 B1 | 8/2002 | Hoffberg |
| 6,430,164 B1 | 8/2002 | Jones |
| 6,433,679 B1 | 8/2002 | Schmid |
| 6,442,485 B2 | 8/2002 | Evans |
| 6,445,308 B1 | 9/2002 | Koike |
| 6,449,541 B1 | 9/2002 | Goldberg et al. |
| 6,452,484 B1 | 9/2002 | Drori |
| 6,463,373 B2 | 10/2002 | Suganuma |
| 6,484,080 B2 | 11/2002 | Breed |
| 6,487,717 B1 | 11/2002 | Brunemann et al. |
| 6,493,338 B1 | 12/2002 | Preston |
| 6,496,107 B1 | 12/2002 | Himmelstein |
| 6,496,117 B2 | 12/2002 | Gutta |
| 6,496,689 B1 | 12/2002 | Keller |
| 6,505,100 B1 | 1/2003 | Stuempfle |
| 6,515,595 B1 | 2/2003 | Obradovich |
| 6,522,875 B1 | 2/2003 | Dowling |
| 6,526,335 B1 | 2/2003 | Treyz et al. |
| 6,542,812 B1 | 4/2003 | Obradovich et al. |
| 6,559,773 B1 | 5/2003 | Berry |
| 6,567,069 B1 | 5/2003 | Bontrager et al. |
| 6,571,136 B1 | 5/2003 | Staiger |
| 6,574,734 B1 | 6/2003 | Colson et al. |
| 6,584,403 B2 | 6/2003 | Bunn |
| D479,228 S | 9/2003 | Sakaguchi et al. |
| 6,614,349 B1 | 9/2003 | Proctor et al. |
| 6,615,137 B2 | 9/2003 | Lutter |
| 6,616,071 B2 | 9/2003 | Kitamura |
| 6,622,083 B1 | 9/2003 | Knockeart |
| 6,629,033 B2 | 9/2003 | Preston |
| 6,641,087 B1 | 11/2003 | Nelson |
| 6,647,270 B1 | 11/2003 | Himmelstein |
| 6,647,328 B2 | 11/2003 | Walker |
| 6,670,912 B2 | 12/2003 | Honda |
| 6,675,081 B2 | 1/2004 | Shuman |
| 6,678,892 B1 | 1/2004 | Lavelle et al. |
| 6,681,121 B1 | 1/2004 | Preston |
| 6,690,681 B1 | 2/2004 | Preston |
| 6,707,421 B1 | 3/2004 | Drury et al. |
| 6,708,100 B2 | 3/2004 | Russell |
| 6,714,139 B2 | 3/2004 | Saito |
| 6,718,187 B1 | 4/2004 | Takagi et al. |
| 6,725,031 B2 | 4/2004 | Watler |
| 6,734,799 B2 | 5/2004 | Munch |
| 6,738,697 B2 | 5/2004 | Breed |
| 6,748,278 B1 | 6/2004 | Maymudes et al. |
| 6,765,495 B1 | 7/2004 | Dunning et al. |
| 6,771,208 B2 | 8/2004 | Lutter |
| 6,771,629 B1 | 8/2004 | Preston |
| 6,778,073 B2 | 8/2004 | Lutter |

| | | |
|---|---|---|
| 6,778,924 B2 | 8/2004 | Hanse |
| 6,782,315 B2 | 8/2004 | Lu |
| 6,785,551 B1 | 8/2004 | Richard |
| 6,792,351 B2 | 9/2004 | Lutter |
| 6,799,092 B2 | 9/2004 | Lu |
| 6,816,458 B1 | 11/2004 | Kroon |
| 6,876,642 B1 | 4/2005 | Adams |
| 6,892,230 B1 | 5/2005 | Gu et al. |
| 6,895,238 B2 | 5/2005 | Newell |
| 6,895,240 B2 | 5/2005 | Laursen |
| 6,901,057 B2 | 5/2005 | Rune |
| 6,906,619 B2 | 6/2005 | Williams |
| 6,920,129 B2 | 7/2005 | Preston |
| 6,925,368 B2 | 8/2005 | Funkhouser et al. |
| 6,937,732 B2 | 8/2005 | Ohmura |
| 6,952,155 B2 | 10/2005 | Himmelstein |
| 6,972,669 B2 | 12/2005 | Saito |
| 6,973,030 B2 | 12/2005 | Pecen |
| 6,980,092 B2 | 12/2005 | Turnbull |
| 6,993,511 B2 | 1/2006 | Himmelstein |
| 7,000,469 B2 | 2/2006 | Foxlin |
| 7,006,950 B1 | 2/2006 | Greiffenhagen |
| 7,024,363 B1 | 4/2006 | Comerford |
| 7,079,993 B2 | 7/2006 | Stephenson |
| 7,085,710 B1 | 8/2006 | Beckert et al. |
| 7,089,206 B2 | 8/2006 | Martin |
| 7,092,723 B2 | 8/2006 | Himmelstein |
| 7,103,646 B1 | 9/2006 | Suzuki |
| 7,120,129 B2 | 10/2006 | Ayyagari |
| 7,123,926 B2 | 10/2006 | Himmelstein |
| 7,146,260 B2 | 12/2006 | Preston |
| 7,151,768 B2 | 12/2006 | Preston |
| 7,158,842 B2 | 1/2007 | Ohmura |
| 7,158,956 B1 | 1/2007 | Himmelstein |
| 7,164,662 B2 | 1/2007 | Preston |
| 7,171,189 B2 | 1/2007 | Bianconi |
| 7,178,049 B2 | 2/2007 | Lutter |
| 7,187,947 B1 | 3/2007 | White |
| 7,206,305 B2 | 4/2007 | Preston |
| 7,207,042 B2 | 4/2007 | Smith |
| 7,215,965 B2 | 5/2007 | Fournier et al. |
| 7,216,347 B1 | 5/2007 | Harrison et al. |
| 7,221,669 B2 | 5/2007 | Preston |
| 7,239,949 B2 | 7/2007 | Lu |
| 7,249,266 B2 | 7/2007 | Margalit |
| 7,257,426 B1 | 8/2007 | Witkowski |
| 7,263,332 B1 | 8/2007 | Nelson |
| 7,269,188 B2 | 9/2007 | Smith |
| 7,272,637 B1 | 9/2007 | Himmelstein |
| 7,274,988 B2 | 9/2007 | Mukaiyama |
| 7,277,693 B2 | 10/2007 | Chen |
| 7,283,567 B2 | 10/2007 | Preston |
| 7,283,904 B2 | 10/2007 | Benjamin |
| 7,286,522 B2 | 10/2007 | Preston |
| 7,317,696 B2 | 1/2008 | Preston |
| 7,343,160 B2 | 3/2008 | Morton |
| 7,375,728 B2 | 5/2008 | Donath |
| 7,379,707 B2 | 5/2008 | DiFonzo |
| 7,411,982 B2 | 8/2008 | Smith |
| 7,418,476 B2 | 8/2008 | Salesky |
| 7,450,955 B2 | 11/2008 | Himmelstein |
| 7,484,008 B1 | 1/2009 | Gelvin |
| 7,493,645 B1 | 2/2009 | Tranchina |
| 7,506,020 B2 | 3/2009 | Ellis |
| 7,508,810 B2 | 3/2009 | Moinzadeh |
| 7,509,134 B2 | 3/2009 | Fournier et al. |
| 7,587,370 B2 | 9/2009 | Himmelstein |
| 7,594,000 B2 | 9/2009 | Himmelstein |
| 7,596,391 B2 | 9/2009 | Himmelstein |
| 7,599,715 B2 | 10/2009 | Himmelstein |
| 7,610,331 B1 | 10/2009 | Genske |
| 7,614,055 B2 | 11/2009 | Buskens et al. |
| 7,664,315 B2 | 2/2010 | Woodfill |
| 7,733,853 B2 | 6/2010 | Moinzadeh et al. |
| 7,747,281 B2 | 6/2010 | Preston |
| 7,793,136 B2 * | 9/2010 | Lutter ............................... 714/1 |
| 7,848,763 B2 | 12/2010 | Fournier et al. |
| 7,924,934 B2 | 4/2011 | Birmingham |
| 7,966,111 B2 | 6/2011 | Moinzadeh et al. |
| 7,979,095 B2 | 7/2011 | Birmingham |
| 7,983,310 B2 | 7/2011 | Hirano et al. |
| 8,014,942 B2 | 9/2011 | Moinzadeh et al. |
| 8,020,028 B1 * | 9/2011 | Lutter ............................... 714/1 |
| 8,036,201 B2 | 10/2011 | Moinzadeh et al. |
| 8,036,600 B2 | 10/2011 | Garrett et al. |
| 8,068,792 B2 | 11/2011 | Preston |
| 8,108,092 B2 | 1/2012 | Phillips et al. |
| 2001/0009855 A1 | 7/2001 | L'Anson |
| 2002/0012329 A1 | 1/2002 | Atkinson |
| 2002/0022927 A1 | 2/2002 | Lemelson et al. |
| 2002/0070852 A1 | 6/2002 | Trauner |
| 2002/0085043 A1 | 7/2002 | Ribak |
| 2002/0095501 A1 | 7/2002 | Chiloyan et al. |
| 2002/0098878 A1 | 7/2002 | Mooney et al. |
| 2002/0105423 A1 | 8/2002 | Rast |
| 2002/0123325 A1 | 9/2002 | Cooper |
| 2002/0144010 A1 | 10/2002 | Younis |
| 2002/0144079 A1 | 10/2002 | Willis et al. |
| 2003/0060188 A1 | 3/2003 | Gidron |
| 2003/0158614 A1 | 8/2003 | Friel |
| 2003/0212996 A1 | 11/2003 | Wolzien |
| 2004/0162064 A1 | 8/2004 | Himmelstein |
| 2004/0164228 A1 | 8/2004 | Fogg |
| 2005/0009506 A1 | 1/2005 | Smolentzov |
| 2005/0070221 A1 | 3/2005 | Upton |
| 2005/0130656 A1 | 6/2005 | Chen |
| 2005/0153654 A1 | 7/2005 | Anderson |
| 2005/0251328 A1 | 11/2005 | Merwe et al. |
| 2005/0260984 A1 | 11/2005 | Karabinis |
| 2005/0275505 A1 | 12/2005 | Himmelstein |
| 2005/0278712 A1 | 12/2005 | Buskens et al. |
| 2006/0293829 A1 | 12/2006 | Cornwell et al. |
| 2007/0115868 A1 | 5/2007 | Chen |
| 2007/0115897 A1 | 5/2007 | Chen |
| 2007/0260372 A1 | 11/2007 | Langer et al. |
| 2007/0260373 A1 | 11/2007 | Langer et al. |
| 2008/0092140 A1 | 4/2008 | Doninger et al. |
| 2009/0090592 A1 | 4/2009 | Mordukhovich et al. |

FOREIGN PATENT DOCUMENTS

| | | |
|---|---|---|
| DE | 19647283 A1 | 5/1997 |
| DE | 19922608 | 11/2000 |
| DE | 19931161 | 1/2001 |
| EP | 0355490 B1 | 2/1990 |
| EP | 0 441 576 | 8/1991 |
| EP | 0473866 A2 | 3/1992 |
| EP | 0 841 648 | 5/1998 |
| EP | 0841648 | 5/1998 |
| EP | 1 355 128 | 10/2003 |
| JP | 10-076115 | 10/1999 |
| JP | 2000207691 | 7/2000 |
| KR | 1995-0017619 | 7/1995 |
| KR | 1999-021740 | 3/1999 |
| WO | WO9624229 | 8/1996 |
| WO | WO9908436 | 2/1999 |
| WO | WO9957662 | 11/1999 |
| WO | WO9965183 | 12/1999 |
| WO | WO 0029948 | 5/2000 |
| WO | WO0040038 | 7/2000 |
| WO | WO0130061 | 4/2001 |
| WO | WO0158110 | 8/2001 |
| WO | WO/03/033092 | 4/2003 |

OTHER PUBLICATIONS

Ada 95 Transition Support—Lessons Learned, Sections 3, 4, and 5, CACI, Inc.—Federal, Nov. 15, 1996, 14 pages.
AMIC. Architecture specification release 1, 2001; 35 pages.
Bluetooth Doc; Advance Audio Distribution Profile Specification; Adopted version 1.0; dated May 22, 2003; 75 pages.
Bluetooth Doc; Audio/Video Remote Control Profile; Version 1.0 Adopted; dated May 22, 2003; 52 pages.
Bluetooth Hands-free Profile 1.5 Nov. 25, 2005.
Bluetooth Specification version 1.1; Feb. 22, 2001; 452 pages.
Boeing News Release, "Boeing Demonstrates JSF Avionics Multi-Sensor Fusion", Seattle, WA, May 9, 2000, pp. 1-2.
Boeing Statement, "Chairman and CEO Phil Condit on the JSF Decision", Washington, D.C., Oct. 26, 2001, pp. 1-2.

Counterair: The Cutting Edge, Ch. 2 "The Evolutionary Trajectory The Fighter Pilot-Here to Stay?" AF2025 v3c8-2, Dec. 1996, pp. 1-7.
Counterair: The Cutting Edge, Ch. 4 "The Virtual Trajectory Air Superiority without an "Air" Force?" AF2025 v3c8-4, Dec. 1996, pp. 1-12.
Embedded Bluetooth Migrates to Lisbon and Seattle; 11 pages; Jan. 23, 2008.
Green Hills Software, Inc., "The AdaMULTI 2000 Integrated Development Environment," Copyright 2002, printed Jul. 9, 2002; 7 pages.
H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, 2001, pp. 1-6.
Hitachi Automated Highway System (AHS), Automotive Products, Hitachi, Ltd., Copyright 1994-2002, 8 pages.
IEEE Standard for Information Technology—POSIX Based Supercomputing Application Environment Profile; Jun. 14, 1995, 72 pages.
ISIS Project: Sensor Fusion, Linkoping University Division of Automatic Control and Communication Systems in cooperation with SAAB (Dynamics and Aircraft), 2001, 18 pages.
J. Takezaki, N. Ueki, T. Minowa, H. Kondoh, "Support System for Safe Driving—A Step Toward Its Autonomous Driving--", Hitachi Review, vol. 49, Nov. 3, 2000, pp. 1-8.
Joint Strike Fighter Terrain Database, ets-news.com "Simulator Solutions" 2002, 3 pages.
Luttge, Karsten; "E-Charging API: Outsource Charging to a Payment Service Provider"; IEEE; 2001 (pp. 216-222).
M. Chantler, G. Russel, and R. Dunbar, "Probabilistic Sensor Fusion for Reliable Workspace Sensing", Fourth IARP workshop on Underwater Robotics, Genoa, Nov. 1992, pp. 1-14.
MSRC Redacted Proposal, 3.0 Architecture Development, Aug. 29, 2002; pp. 1-43.
MyGig User Guide; Mar. 11, 2008.
Powerpoint Presentation by Robert Allen—Boeing Phantom Works entitled "Real-Time Embedded Avionics System Security and COTS Operating Systems", Open Group Real-Time Forum, Jul. 18, 2001, 16 pages.
Product description of Raytheon Electronic Systems (ES), Copyright 2002, pp. 1-2.
Product description of Raytheon RT Secure, "Development Environment", Copyright 2001, pp. 1-2.
Product description of Raytheon RT Secure, "Embedded Hard Real-Time Secure Operating System", Copyright 2000, pp. 1-2.
Product description of Raytheon RT Secure, Copyright 2001, pp. 1-2.
S.G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1-5.
Specification of the Bluetooth System v1.0.B; Dec. 1, 1999.
Specification of the Bluetooth System v1.1; Feb. 22, 2001.
TNO FEL Annual Review 1998: Quality works, Observation Systems Division; "The Whole is More Than the Sum of its Parts"; 16 pages.
Vehicle Dynamics Lab, University of California, Berkeley, funded by BMW, current members: D. Caveney and B. Feldman, "Adaptive Cruise Control", at least as early as 2002, printed Jul. 2, 2002; 17 pages.
Stirling A: "Mobile Multimedia platforms" Vehicular Technology Conference Fall 2000. IEEE VTS Fall VTC2000. 52nd Vehicular Technology Conference (Cat. No. 00CH37152).
Nusser R. et al.: "Bluetooth-based wireless connectivity in an automotive environment" Vehicular Technology Conference Fall 2000. IEEE VTS Fall VTC2000 52nd Vehicular Technology Conference (Cat. No. 00CH37152).
Martins E F V et al. "design of an OS9 operating system extension for a message-passing multiprocessor" Microprocessors and Microsystems, IPC Business Press LT. London, BG, vol. 21, No. 9, Apr. 1, 1998, pp. 533-543.

Gutierrez Garcia JJ et al. "Minimizing the effects of jitter in distributed hard real-time systems" Journal of Systems Architecture, Elsevier Science Publishers BV., Amsterdam, NL, vol. 41, No. 6/7. Dec. 15, 1996, pp. 431-447.
International Search Report for PCT/US02/020402; Mailing date Apr. 3, 2003.
International Search Report for PCT/US02/020403; Mailing date Jan. 27, 2003.
International Search Report for PCT/US02/016364; Mailing date Feb. 14, 2003.
International Search Report for PCT/US02/016371; Mailing date Aug. 18, 2003.
Stolowitz Ford Cowger LLP Listing of Related Cases Oct. 18, 2011.
Robert Bosch GmbH, "CAN Specification, Version 2.0," Sep. 1991.
Wang, Z. et al. "A Message Priority Assignment Algorithm for CAN-based Networks," in CSC '92 Proceedings of the 1992 ACM Annual Conference on Communications, Mar. 1992.
Fay-Wolfe, et al., "Real-Time CORBA," IEEE Transactions on Parallel and Distributed Systems, vol. 11, Issue 10 (Oct. 2000).
Rene Nusser and Rodolfo Mann Pelz, "Bluetooth-based Wireless Connectivity in an Automotive Environment," IEEE pp. 1935-1942, Vehicular Technology Conference, 2000.
Husein et al., "A Priority Based Service Algorithm for Use in Time-Critical and Integrated Services Networks," Proceedings of IEEE Singapore International Conference, vol. 1, pp. 93-97, 1993.
Release 1 Specification Set from the Automotive Multimedia Interface Collaboration (AMI-C), Jan. 2001.
Open Services Gateway Initiative (OSGi) Service Gateway Specification Release 1.0, May 2000.
Ellis, S. M. , "Dynamic Software Reconfiguration for Fault-Tolerant Real-Time Avionic Systems," Microprocessor and Microsystems, Proceedings of the 1996 Avionics Conference and Exhibition, vol. 21, issue 1, pp. 29-39, Jul. 1997.
Peter Walzer, and Hans-Wilhelm Grove, "Integrated Research Volkswagen (IRVW) Futura," Passenger Car Meeting and Exposition, Dearborn, Michigan, Sep. 17-20, 1990.
Specification vol. 1, Specification of the Bluetooth System, Version 1.1, Feb. 22, 2001.
Bluetooth ESDP for UPnP, prepared by Arun Ayyagan, Jan. 31, 2001.
Nace, W. & Koopman, P., "A Product Family Based Approach to Graceful Degradation," Proceedings of Dipes 2000, International IFIP WG 10.3/WG 10.4/ WG 10.5 Workshop on, Distributed and Parallel Embedded Systems, Paderborn University, Germany, Oct. 18-19, 2000.
Meredith Beveridge, "M.S. Project Report, Jini on the Control Area Network (CAN): A Case Study in Portability Failure", Department of Electrical and Computer Engineering, Carnegie Mellon University, Phil Koopman- advisor, Mar. 2001.
Universal Serial Bus Specification, Revision 1.1, Compaq, Intel, Microsoft and NEC, Sep. 23, 1998.
Universal Serial Bus Specification , Revision 2.0, Compaq, Hewlett-Packard, Intel, Lucent, Microsoft, NEC and Philips, Apr. 27, 2000.
Tindell, Ken, et al, "A CAN Communications Concept with Guaranteed Message Latencies", Oct. 1998.
Robinson, Ralph L., "An Open Versus Closed Architecture for Multimedia Systems," Proceedings of the 2000 International Congress on Transportation Electronics, pp. 445450, Oct. 2000.
Y. Chubachi and H. Okagaki , "The Development of Traffic Information System Using AutoPC," Proceedings of the 2000 International Congress on Transportation Electronics, pp. 81-88, Oct. 2000.
USBlyzer, "Brief Overview of USB History".
M. Tchorowski and J. Mate, "Avionics and Automotive bandwagon flying together on the infotronics Highway," Proceedings of the 1998 International Congress on Transportation Electronics, pp. 351-354, Oct. 1998.
Fout, Tom, "Universal Plug and Play in Windows XP," Jul. 1, 2001.
Yen, H.W., et al., "Information Security and Integrity in Network Vehicle," Proceedings of the 1998 International Congress on Transportation Electronics, pp. 319-323, Oct. 1998.
Minagawa, Shoichi, et al, "Open Architectural Car Multimedia Platform," Proceedings of the 1998 International Congress on Transportation Electronics, pp. 198-194 Oct. 1998.

Kanemitsu, Dean et al. "Productivitys Next Dimension—The Mobile Office Computing Platform," Proceedings of the 2000 International Congress on Transportation Electronics, pp. 159-165, Oct. 2000.

Bhaskaran, Parvathy, "Reinventing the Car Radio for the Internet-the iRadio™," Proceedings of the 2000, International Congress on Transportation Electronics, pp. 147-153, Oct. 2000.

Buckley, Stephen, et al., "The Car as a Peripheral-Adapting a Portable Computer to a Vehicle Intranet," Proceedings of the 1998 International Congress on Transportation Electronics, pp. 211-217, Oct. 1998.

Arnold, Ken, et al., "The Jini Specification," Publisher Addison-Wesley, 1999.

Powers, Chuck, et al., Today's Electronics in Todays Vehicles, Proceedings of the 1998 International Congress on Transportation Electronics, pp. 195-200, Oct. 1998.

Vaught, Mark A., "Phone-Activated Auto-Muting Circuit," Jan. 1990.

Clarion Co. Ltd., "Clarion AutoPC 310C Owner's Manual," 1998.

Clarion, "2002 Clarion Product Catalog Car Audio, Multimedia, Marine, and Security Retail Products," 2002.

Clarion Co., Ltd., "Joyride Quick Reference Guide," 2000-2001.

Joyride, Windows CE System Software User's Manual, 1999-2001.

Lind, R., et al., "The Network Vehicle- A Glimpse into the Future of Mobile Multi-Media," IEEE AES Systems Magazine, Sep. 1999.

First Amended Complaint and Answer from *Eagle Harbor Holdings, LLC*, and *Mediustech, LLC*, v. *Ford Motor Company*, Washington Western District Court, Case No. 3:11-CV-05503-BHS, Case filed: Jun. 30, 2011.

Exhibits and Modules from *Eagle Harbor Holdings, LLC*, and *Mediustech, LLC*, v. *Ford Motor Company*, Washington Western District Court, Case No. 3:11-CV-05503-BHS, Case filed: Jun. 30, 2011.

Stolowitz Ford Cowger LLP, Listing of Related Cases, Jun. 14, 2012.

* cited by examiner

FAILURE DETERMINATION SYSTEM

This application is a continuation of U.S. patent application Ser. No. 12/851,488, filed Aug. 5, 2010 U.S. Pat. No. 8,020,028 entitled: AN APPLICATION MANAGEMENT SYSTEM FOR MOBILE DEVICES (As Amended), which is a continuation of U.S. patent application Ser. No. 11/616,650, filed Dec. 27, 2006 entitled: METHOD FOR MULTI-TASKING MULTIPLE JAVA VIRTUAL MACHINES IN A SECURE ENVIRONMENT, now U.S. Pat. No. 7,793,136, issued Sep. 7, 2010, which is a continuation of Ser. No. 10/132,886, filed on Apr. 24, 2002, now U.S. Pat. No. 7,178,049 issued Feb. 13, 2007 entitled: METHOD FOR MULTI-TASKING MULTIPLE JAVA VIRTUAL MACHINES IN A SECURE ENVIRONMENT, which are both incorporated by referenced in their entirety.

This application incorporates by reference U.S. patent application Ser. No. 09/841,753, filed Apr. 24, 2001 entitled: OPEN COMMUNICATION SYSTEM FOR REAL-TIME MULTIPROCESSOR APPLICATIONS, now U.S. Pat. No. 6,629,033, issued Sep. 30, 2003, and U.S. patent application Ser. No. 09/841,915, filed Apr. 24, 2001 entitled: METHOD AND APPARATUS FOR DYNAMIC CONFIGURATION OF MULTIPROCESSOR SYSTEM, now U.S. Pat. No. 7,146,260 issued Dec. 5, 2006.

BACKGROUND OF THE INVENTION

Java is a robust, object-oriented programming language expressly designed for use in the distributed environment of the Internet. Java can be used to create complete applications that may run on a single computer or be distributed among servers and clients in a network. A source program in Java is compiled into byte code, which can be run anywhere in a network on a server or a client that has a Java virtual machine (JVM).

A JVM describes software that is nothing more than an interface between the compiled byte code and the microprocessor or hardware platform that actually performs the program's instructions. Thus, the JVM makes it possible for Java application programs to be built that can run on any platform without having to be rewritten or recompiled by the programmer for each separate platform.

Jini is a distributed system based on the idea of federating groups of users and the resources required by those users. Resources can be implemented either as hardware devices, software programs, or a combination of the two. The Jini system extends the Java application environment from a single virtual machine to a network of machines. The Java application environment provides a good computing platform for distributed computing because both code and data can move from machine to machine. The Jini infrastructure provides mechanisms for devices, services, and users to join and detach from a network. Jini systems are more dynamic than is currently possible in networked groups where configuring a network is a centralized function done by hand.

However, the Java/Jini approach is not without its disadvantages. Both Java and Jini are free, open source applications. The Java application environment is not designed for controlling messaging between different machines. For example, the Java application is not concerned about the protocols between different hardware platforms. Jini has some built-in security that allows code to be downloaded and run from different machines in confidence. However, this limited security is insufficient for environments where it is necessary to further restrict code sharing or operation sharing among selected devices in a secure embedded system.

SUMMARY OF THE INVENTION

The present invention allows construction of a secure, real-time operating system from a portable language such as Java that appears to be a Java virtual machine from a top perspective but provides a secure operating system from a bottom perspective. This allows portable languages, such as Java, to be used for secure embedded multiprocessor environments.

The foregoing and other objects, features and advantages of the invention will become more readily apparent from the following detailed description of a preferred embodiment of the invention which proceeds with reference to the accompanying drawings.

DETAILED DESCRIPTION

A java application stack includes a Java layer 5 for running any one of multiple different applications. In one example, the applications are related to different vehicle operations such as Infrared (IR) and radar sensor control and monitoring, vehicle brake control, vehicle audio and video control, environmental control, driver assistance control, etc. A Java Virtual Machine (JVM) layer 16 provides the hardware independent platform for running the Java applications 5. A Jini layer 12 provides some limited security for the Java applications that run on different machines. However, the Jini layer 12 does not provide the necessary reconfiguration and security management necessary for a distributed real-time multiprocessor system.

A Secure Real-time Executive (SRE) 14 provides an extension to the JVM 16 and allows Java to run on different processors for real-time applications. The SRE 20 manages messaging, security, critical data, file I/O multiprocessor task control and watchdog tasks in the Java environment as described below. The JVM 16, Jini 12 and SRE 14 can all be implemented in the same JVM 10, However, for explanation purposes, the JVM 10 and the SRE 14 will be shown as separate elements.

Figure 1:
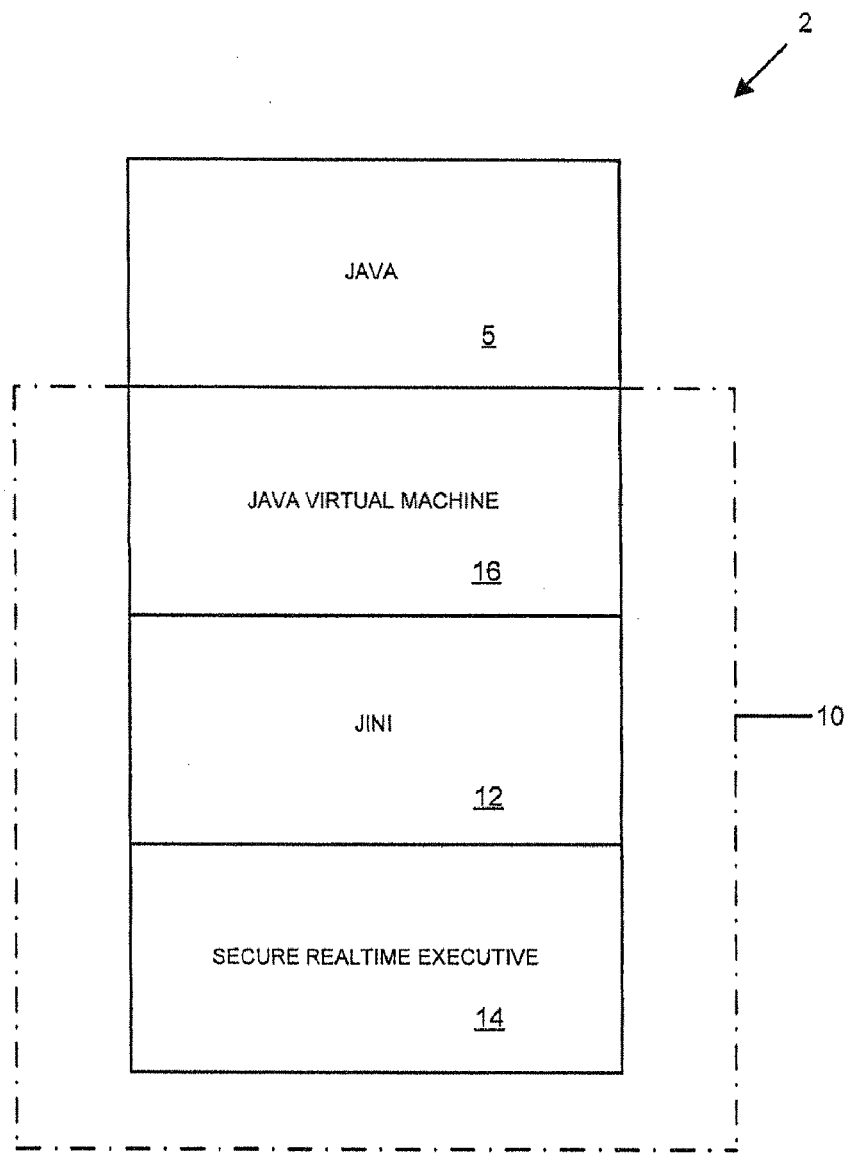
FIG. 1 is a diagram showing a java stack with an additional Secure Real-time Executive (SRE) layer.
Figure 2:
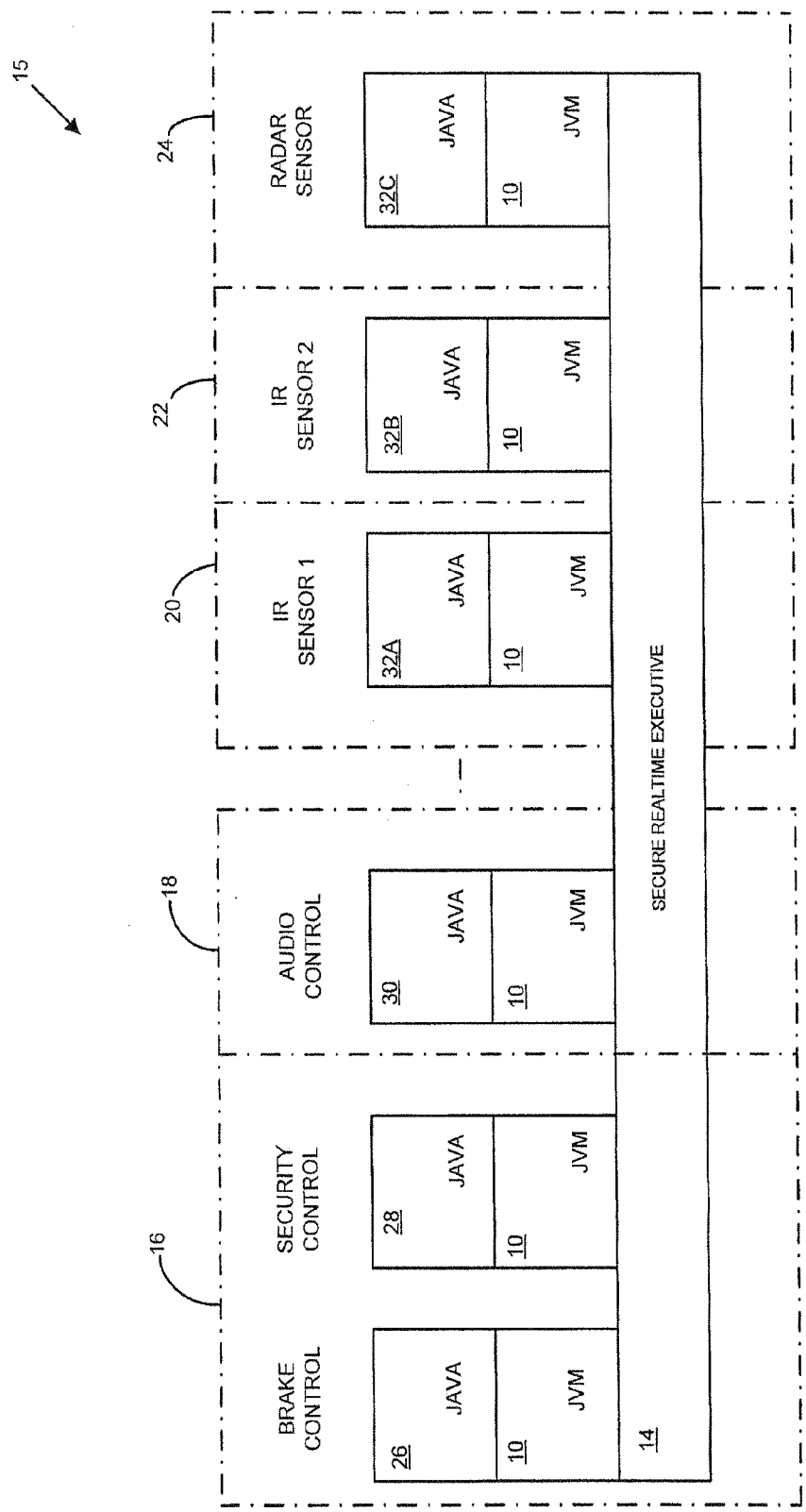
FIG. 2 is a diagram of a multiprocessor system that runs multiple Java Virtual Machines that each include a SRE.

FIG. 2 shows a system 15 that includes multiple processors 16, 18, 20, 22 and 24. Each processor includes one or more JVMs 10 that run different Java applications. For example, processor 16 includes one Java application 28 that controls a vehicle security system and another Java application 26 that controls the vehicles antilock brakes. A processor 18 includes a Sava application 30 that controls audio sources in the vehicle, Other processors 20 and 22 may run different threads 32A and 32B for the same sensor fusion Java application 32 that monitors different IR sensors. Another thread 32C on processor 24 monitors a radar sensor for the sensor fusion Java application 32.

The SRE 14 runs below the JVMs 10 in each processor and control tasks, messaging, security, etc. For example, the Java application 26 controls vehicle braking according to the sensor data collected by the sensor fusion Java application 32. The SRE 14 in one example prevents unauthorized data from being loaded into the processor 16 that runs brake control application 26. The SRE 14 also prevents other Java applications that are allowed to be loaded into processor 16 from disrupting critical braking operations, or taking priority over the braking operations, performed by Java application 26, For example, the SRE 14 may prevent noncritical vehicle applications, such as audio control, from being loaded onto processor 16. In another example, noncritical operations, such as security control application 28, are allowed to be loaded onto processor 16. However, the SRE 14 assigns the security messages low priority values that will only be processed when there are no braking tasks in application 26 that require processing by processor 16.

The SRE 14 allows any variety of real-time, mission critical, nonreal-time and nonmission critical Java applications to be loaded onto the multiprocessor system 15, The SRE 14 then automatically manages the different types of applications and messages to ensure that the critical vehicle applications are not corrupted and processed with the necessary priority. The SRE 14 is secure software that cannot be manipulated by other Java applications.

The SRE 14 provides priority preemption on a message scale across the entire system 15 and priority preemption on a task scale across the entire system 15, So the SRE 14 controls how the JVMs 10 talk to each other and controls how the JVMs 10 are started or initiated to perform tasks. The SRE 14 allows programmers to write applications using Java in a safe and secure real time environment, Thus, viruses can be prevented by SRE 14 from infiltrating the system 15.

While the explanation uses Java as one example of a programming environment where SRE 14 can be implemented, it should be understood that the SRE 14 can be integrated into any variety of different programming environments that may run in the same or different systems 15. For example, SRE 14 can be integrated into an Application Programmers Interface (API) for use with any programming language such as C++.

Figure 3:
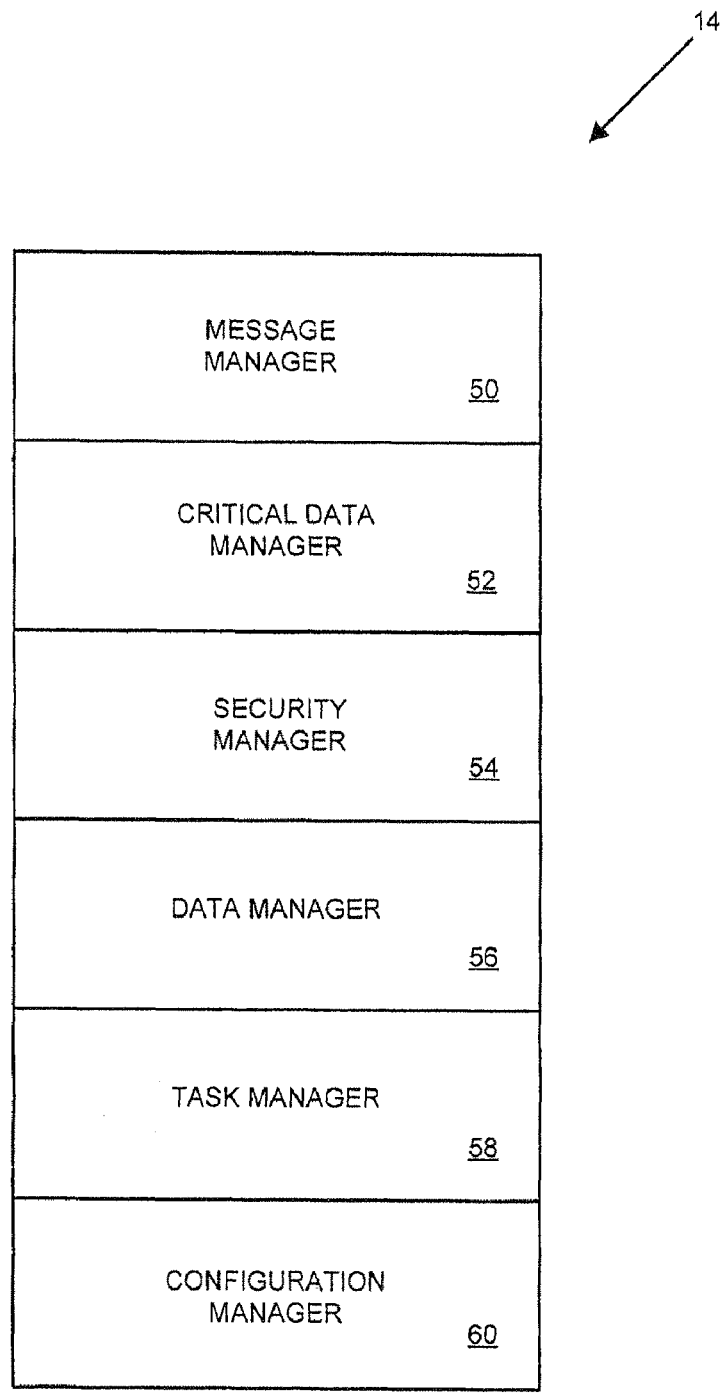
FIG. 3 is a detailed diagram of the managers in the SRE.

FIG. 3 shows the different functions that are performed by the SRE 20. Any combination of the functions described below can be provided in the SRE 20. A message manager 50 controls the order messages are received and transmitted by the different Java applications. A security manager 52 controls what data and messages are allowed to be received or transmitted by different Java applications. A critical data manager 54 controls what data is archived by the different Java applications.

A data manager 56 controls what data is allowed to be transferred between different processors. A task manager 58 controls the order tasks are performed by the different JVMs. A reconfiguration manager 60 monitors the operation of the different processors in the system and reassigns or reconfigures Java applications and Java threads to different processors according to what processors have failed or what new processors and applications have been configured into system 15.

The message manager 50 partially corresponds to the priority manager 44 shown in FIG. 2 of U.S. Pat. No. 6,629,033, issued Sep. 30, 2003, the critical data manager 52 partially corresponds with the logging manager 44 shown in FIG. 2 of the '033 patent, and the security manager 54 at least partially corresponds with the security manager 40 shown in the '033 patent. The data manager 56 at least partially corresponds with the date manager 42 shown in FIG. 2 of U.S. Pat. No. 7,146,260 issued Dec. 5, 2006, the task manager 58 partially corresponds to the device manager 46 shown in FIG. 2 of the '260 patent, and the configuration manager 60 at least partially corresponds to the configuration manager 44 shown in FIG. 2 of the '260 patent. The descriptions of how the different manager 50-60 operate similarly to the corresponding manager in the '033 and '260 patents are herein incorporated by reference and are therefore not described in further detail.

However, some specific tasks performed by the managers 50-60 are described below in further detail.

Figure 4:
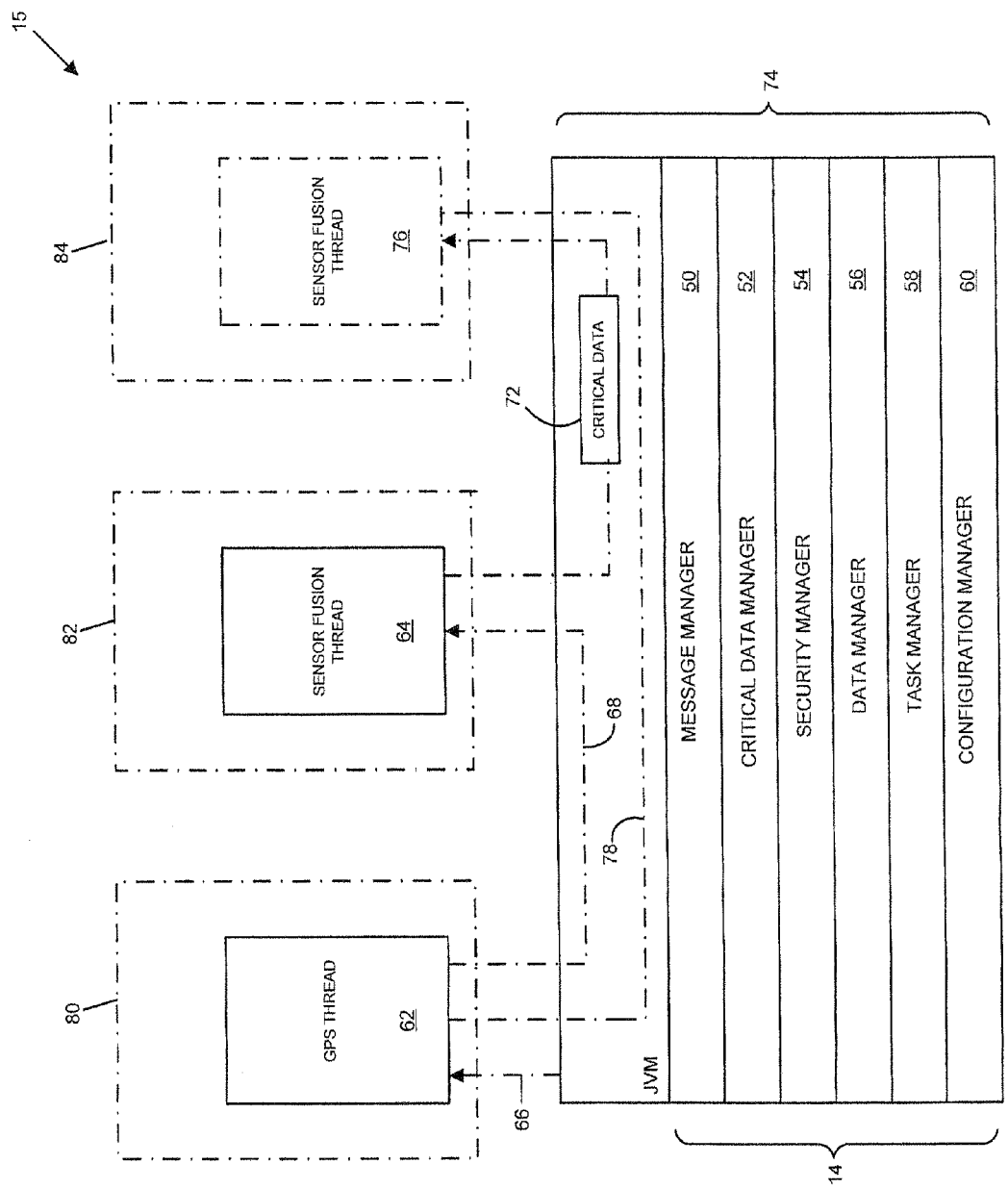
FIG. 4 is a block diagram of how the SRE manages a multiprocessor system.

FIG. 4 shows in more detail how the SRE 14 operates, One of the operations performed by the task manager 58 is to control when different tasks are initiated on different processors. For example, a first Global Positioning System (GPS) thread 62 is running on a JVM in a processor 80. Another sensor fusion thread 64 is running on a different processor 82. Block 74 represents the Java Virtual Machine operating in each of processors 80 and 82. A master JVM 74 may run on either processor 80, processor 82 or on some other processor.

The task manager 58 sends an initiation command 66 to the GPS thread 62 to obtain location data. The task manager 58 then directs the obtained GPS data 68 through a link to the sensor fusion thread 64 for subsequent processing of GPS data 68. The link may be any bus, such as a PCI bus, serial link such as a Universal Serial Bus, a wireless link such as blue tooth or IEEE 802.11, or a network link such as Ethernet, etc.

The configuration manager 60 acts as a watchdog to make sure that the GPS thread 62 and the sensor fusion thread 64 are each running correctly. In one example, separate configuration managers 60 in each processor 80 and 82 sends out periodic signals to the other configuration managers 60 in the other processors, Any one of the configuration managers 60 can detect a processor or application failure by not receiving the periodic "ok" signals from any one of the other processors for some period of time, If a failure is detected, then a particular master configuration manager 60 in one of the processors determines where the task in the failed processor is going to be reloaded. If the master configuration manager 60 dies, then some conventional priority scheme, such as round robin, is used to select another configuration master.

If a failure is detected, say in the processor 82 that is currently performing the sensor fusion thread 64, a message is sent from the configuration manager 60 notifying the task manager 58 which processor is reassigned the sensor fusion thread. In this example, another sensor fusion thread 76 in processor 84 is configured by the configuration manager 60.

The critical data manager 52 manages the retention of any critical data 72 that was previously generated by the sensor fusion thread 64. For example, the critical data manager 54 automatically stores certain data and state information that was currently being used in the sensor fusion thread 64. The critical data may include GPS readings for the last 10 minutes, sensor data obtained from sensors in other processors in the vehicle over the last 10 minutes. The critical data may also include any processed data generated by the sensor fusion thread 64 that identifies any critical vehicle conditions.

The critical data manager 52 also determines which data to archive generally for vehicle maintenance and accident reconstruction purposes. The configuration manager 60 directs the critical data 72 to the new sensor fusion thread 76. The task manager 74 then redirects any new GPS data obtained by the GPS thread 78 to the new sensor fusion thread 76 and controls sensor fusion tasks from application 76. Thus, the configuration manager 60 and the task manager 58 dynamically control how different Java threads are initialized, distributed and activated on different processors.

The message manager 50 determines the priority of sent and received messages. If the data transmitted and received by the sensor fusion thread 76 is higher priority than other data transmitted and received on the processor 84, then the sensor fusion data will be given priority over the other data. The task manager 58 controls the priority that the sensor fusion thread 76 is giving by processor 84. If the sensor fusion thread 76 has higher priority than, for example, an audio application that is also being run by processor 84, then the sensor fusion thread 76 will be performed before the audio application, The SRE 14 can be implemented in any system that needs to be operated in a secure environment. For example, network servers or multiprocessors operating in a home environment. The multiprocessors in home appliances, such as washer and dryers, home computers, home security systems, home heating systems, can be networked together and operate Java applications. The SRE 14 prevents these multiple processors and the software that controls these processors from being corrupted by unauthorized software and also allows the applications on these different processors to operate as one integrated system, The SRE 14 is a controlled trusted computing based that is not accessible by non-authorized application programmers and anyone in the general public. Therefore, the SRE 14 prevents hacking or unauthorized control and access to the processors in the vehicle.

Task Controlled Applications

Debugging is a problem with multiprocessor systems. The task manager 58 allows the Java applications to be run in a lock-step mode to more effectively identify problems in the multiprocessor system 15.

Figure 5:
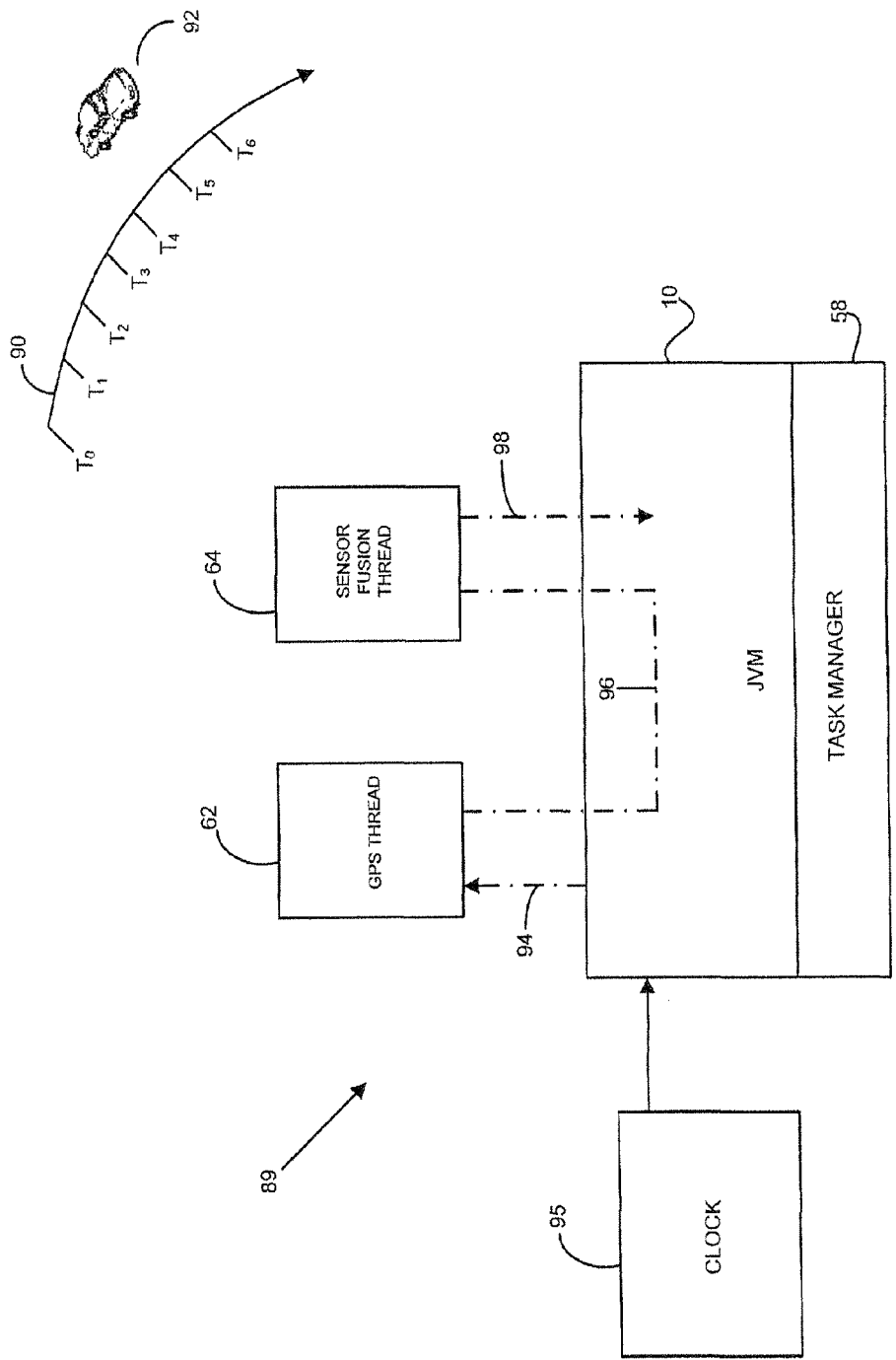
FIG. 5 is a block diagram showing how a task manager in the SRE operates the multiprocessor system in a lock-step mode.

FIG. 5 shows a path 90 taken by a vehicle 92. In one application, the position of the vehicle 92 is sampled every second $t_1$, $t_2$, $t_3$, $t_4$, etc. The position of the vehicle 92 is sampled by a GPS receiver in vehicle 92 that reads a longitudinal and latitudinal position from a GPS satellite. The UPS receiver is controlled by the GPS thread 62 that receives the GPS data and then sends the GPS data to a sensor fusion thread 64 that may run on the same or a different processor in the vehicle 92. The sensor fusion thread 64 can perform any one of many different tasks based on the GPS data. For example, the sensor fusion thread 64 may update a map that is currently being displayed to the driver of vehicle 92 or generate a warning signal to the vehicle driver.

For each sample period $t_N$, the task manager 58 sends a request 94 to the GPS thread 62 to obtain CPS data. The task manager 58 uses a clock 96 as a reference for identifying each one second sample period. Each time a second passes according to clock 96, the task manager 58 sends out the request 94 that wakes up the GPS thread 62 to go read. the GPS data from the GPS satellite. Once the GPS data has been received, the GPS thread 62 passes the GPS data 96 to the sensor fusion thread 64. The GPS thread 62 then goes back into an idle mode until it receives another activation command from the task manager 58.

The task manager 58 can control when the CPS thread 62 is woken up. Instead of the GPS thread 62 being free running, the GPS thread 62 is operating according to a perceived time controlled by the task manager 58. The task manager 58 may send the activation request 94 to the GPS thread 62 once every second during normal sensor fusion operation. When the system is in a debug mode, however, the task manager 58 may only send one activation command 94. This allows the other operations performed by the system 89 to be monitored and determine how the single sampling of GPS data 96 propagates through system 89. The task manager 58 may also delay or disable task initiation to other threads, so that the processing of the GPS data 96 can be isolated.

The task manager 58 can isolate any state in the overall system 89, such as the state of system 89 after a first GPS reading by GPS thread 62 or the state of system 89 after the thirty second GPS reading by GPS thread 62 by controlling when and how often activation commands 94 are sent to GPS thread 62. In a similar manner, the task manager 58 can control when other tasks are performed by the system 89, such as when the sensor fusion thread 64 is activated.

Thus, the task manager 58 controls when Java applications are activated effectively running the overall system 89 in a lock-step mode. The task manager 58 can control the initiation of multiple tasks at the same time. This allows the task manager to control what parameters and operations are performed and used by the different Java threads so that different states in the multiprocessor system 89 can be detected and monitored more effectively.

One application for the task controlled applications is for accident reconstruction. The critical data manager 52 (FIG. 3) may save different vehicle parameters from a vehicle that has been in an accident. For example, sensor data, brake data, speed data, etc. The task manager 58 can feed the saved data into the different Java applications in a lock-step mode to determine how each Java thread processes the saved data. This can then be used to identify any failures that may have occurred in the system 89.

The system described above can use dedicated processor systems, micro controllers, programmable logic devices, or microprocessors that perform some or all of the communication operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A vehicle failure determination system comprising:
    modular processors linked over a network for operating different vehicle applications that control or monitor associated critical and non-critical vehicle operations;
    critical data associated with critical operations, wherein the critical data associated with at least one critical operation is related to at least one of sensor data, brake data, speed data, engine data and GPS data;
    an executive configured to operate in at least one of the processors, wherein the executive is configured to:
        identify and save into memory the critical data, wherein the critical data identified and stored into memory is saved in a lock-step mode to determine how each process thread was executed in the linked modular processors, and wherein the lock-step mode is determined by at least one of a system clock, a system watchdog timer, a message manager, a critical data manager, a security manager, and a data manager;

operate a task manager to determine at least one of a potential system failure or system failure that has occurred in at least one critical operation and how each process thread saved into the memory in the lock-step mode identifies the failure.

2. The failure determination system of claim 1 wherein the network is at least one of wireless and wired links.

3. The failure determination system of claim 1 wherein the different vehicle applications include at least one of safety critical, mission critical and non-critical applications.

4. The failure determination system of claim 3 wherein the safety critical application includes at least one of driver assistance control, vehicle maintenance and accident reconstruction.

5. The failure determination system of claim 3 wherein the mission critical applications include at least one of car braking, car airbag deployment, car sensor monitoring, object detection operations, car audio processing, system diagnostics, GPS data, and driving operations.

6. The failure determination system of claim 1 wherein the sensor data includes at least one of infrared, radar, and video.

7. The failure determination system of claim 1 wherein the executive is secure and runs in a real-time operation, wherein the real-time operation pertains to applications in which the computer must respond as rapidly as required by the user or necessitated by the process being controlled.

8. The failure determination system of claim 1 wherein the task manager is used to reconstruct an accident.

9. The failure determination system of claim 1 wherein the memory is non-volatile.

10. A method of determining a system failure including:
operating different vehicle applications on modular processors linked over a network that control or monitor associated critical and non-critical vehicle operations;
monitoring critical data associated with critical operations, wherein the critical data associated with at least one critical operation is related to at least one of sensor data, brake data, speed data, engine data and GPS data;
operating an executive configured in at least one of the linked processors, wherein the executive is configured to:
identify and save into memory the critical data, wherein the critical data identified and stored into memory is saved in a lock-step mode to determine how each process thread was executed in the linked modular processors, and wherein the lock-step mode is determined by at least one of a system clock, a system watchdog timer, message manager, a critical data manager, a security manager and a data manager;
operate a task manager to determine at least one of a potential system failure or system failure that has occurred in at least one critical operation and how each process thread saved into the memory in the lock-step mode identifies the failure.

11. The failure determination system of claim 10 wherein the network is one of wireless and wired links.

12. The failure determination system of claim 10 wherein the different vehicle applications include at least one of safety critical, mission critical and non-critical applications.

13. The failure determination system of claim 10 wherein the safety critical application includes at least one of driver assistance control, vehicle maintenance, and accident reconstruction.

14. The failure determination system of claim 10 wherein the sensor data includes at least one of infrared, radar, and video.

15. The failure determination system of claim 10 wherein the executive is secure and runs in a real-time operation, wherein the real-time operation pertains to applications in which the computer must respond as rapidly as required by the user or necessitated by the process being controlled.

16. The failure determination system of claim 10 wherein the task manager is used to reconstruct an accident.

17. The failure determination system of claim 10 wherein the memory is non-volatile.

* * * * *

UNITED STATES PATENT AND TRADEMARK OFFICE
Certificate

Patent No. 8,375,243 B1                                                          Patented: February 12, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert Pierce Lutter, Tacoma, WA (US); and Dan Alan Preston, Bainbridge Island, WA (US).

Signed and Sealed this Thirteenth Day of May 2014.

SCOTT BADERMAN
*Supervisory Patent Examiner*
Art Unit 2114
Technology Center 2100